No. 874,592. PATENTED DEC. 24, 1907.

G. M. HOGMIRE.
CULINARY SCRAPER.
APPLICATION FILED APR. 9, 1906.

Witnesses
John B. Coyne
Stephen A. Goodspeed

Inventor.
George M. Hogmire

UNITED STATES PATENT OFFICE.

GEORGE M. HOGMIRE, OF JOLIET, ILLINOIS.

CULINARY SCRAPER.

No. 874,592.  Specification of Letters Patent.  Patented Dec. 24, 1907.

Application filed April 9, 1906. Serial No. 310,657.

*To all whom it may concern:*

Be it known that I, GEORGE M. HOGMIRE, a citizen of the United States, residing at Joliet, in the county of Will and State of Illinois, have invented certain new and useful Improvements in Culinary Scrapers, of which the following is a specification.

My invention relates to improvements in culinary scrapers, and is a useful and novel device for cleaning and removing incrustations from kitchen utensils, and the object of my invention is to supply the trade with a cheap, convenient and durable article for the purpose above named. I attain this object by the mechanism illustrated in the accompanying drawing, in which—

Figure 1:
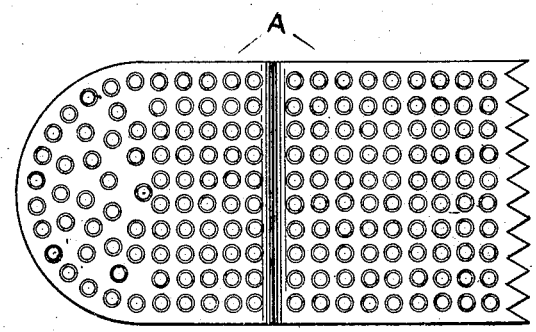
Figure 2:
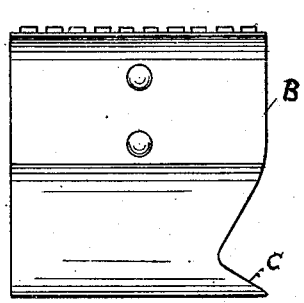
Figure 3:
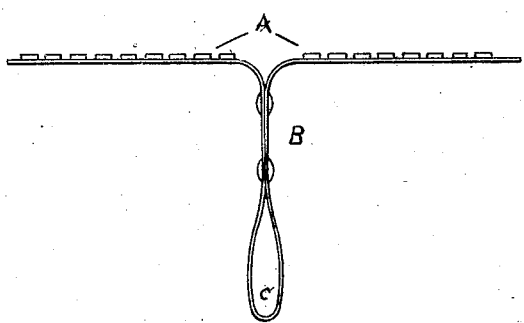

Figure 1 is a bottom plan view of my device; Fig. 2 is an end view thereof, and Fig. 3 is a side view.

The device is composed of a flat sheet of metal doubled over near its center, the two halves connected together and thus forming the handle B, the parts not being folded sharply, but to form a free rounded loop at the gripping portion of the handle, makes possible the formation of a scraping hook or scoop C by cutting away or notching out the edges of said strip at one side of said loop, one end of the gripping portion of the handle forming the nose of the hook or scoop. The end portions A of the strip are bent out at right angles to handle B in opposite directions. One end of the said sheet is rounded and the other end is square and edge notched similar to teeth of a saw. Scraping projections are formed on the flat surfaces of the end portions A on the side opposite the handle B. Where there are hard incrustations, such as lime deposits, the teeth can be used to loosen the same, and then the scraping projections; the rounded end is for especial use in the curves in the bottoms of kitchen utensils, and the hook C for joints and angles in the same.

What I claim as my invention, is—

1. A culinary scraper, composed of a flat strip of sheet metal doubled over near its center and the two halves connected together to form a handle, the end portions of said strip being bent out at right angles to said handle in opposite directions, and scraping projections formed on the faces of said end portions opposite the handle.

2. A culinary scraper, composed of a flat strip of sheet metal doubled over near its center and the two halves rigidly united near said point of folding to form a handle portion, a free rounded loop being formed at the point of folding, the end portions of said strip being bent out at an angle to said handle portion to form scraping blades, and the edges of the strip at one side of said loop being cut out to form a scraping hook, all as described and set forth.

In testimony whereof I affix my signature in presence of two witnesses.

GEORGE M. HOGMIRE.

Witnesses:
JOHN B. COYNE,
STEPHEN A. GOODSPEED.